United States Patent [19]

Northup

[11] Patent Number: 4,507,136
[45] Date of Patent: Mar. 26, 1985

[54] METHOD FOR MAKING GLASS BOTTLES

[75] Inventor: John D. Northup, Toledo, Ohio

[73] Assignees: John D. Northup, Jr.; Mary E. Northup; Nancy N. Lehrkind, ; a part interest to each

[21] Appl. No.: 526,545

[22] Filed: Aug. 26, 1983

Related U.S. Application Data

[63] Continuation-in-part of Ser. No. 286,970, Jul. 27, 1981, abandoned, and Ser. No. 398,363, Jul. 14, 1982, abandoned.

[51] Int. Cl.$^3$ .............................................. C03B 9/14
[52] U.S. Cl. ........................................ 65/79; 65/76; 65/239; 65/260
[58] Field of Search ................ 65/79, 230, 232, 241, 65/229, 239, 76, 260, 72, 77

[56] References Cited

U.S. PATENT DOCUMENTS

| | | | |
|---|---|---|---|
| Re. 28,063 | 7/1974 | Scalora | 264/97 |
| Re. 29,045 | 11/1976 | Uhlig | 264/89 |
| 403,716 | 5/1889 | Ashley | 65/263 |
| 944,053 | 12/1909 | Savage . | |
| 1,197,837 | 9/1916 | Loper . | |
| 1,292,051 | 1/1919 | Rau . | |
| 1,833,623 | 11/1931 | Smith | 65/241 |
| 1,843,160 | 2/1932 | Ingle . | |
| 1,911,119 | 5/1933 | Ingle . | |
| 1,968,777 | 7/1934 | Bridges | 65/264 |
| 2,075,363 | 3/1937 | Smith . | |
| 2,118,793 | 5/1938 | Howard . | |
| 2,151,876 | 3/1939 | Wadman . | |
| 2,238,803 | 4/1941 | Berthold . | |
| 2,289,046 | 7/1942 | Rowe . | |
| 2,919,462 | 1/1960 | Friden . | |
| 3,024,571 | 3/1962 | Abbott . | |
| 3,184,297 | 5/1965 | Van Zonneveld | 65/78 |
| 3,216,813 | 11/1965 | Mumford | 65/239 |
| 3,271,127 | 9/1966 | Wendle | 65/207 |
| 3,288,898 | 11/1966 | West | 264/98 |
| 3,311,684 | 3/1967 | Heider | 264/99 |
| 3,329,492 | 7/1967 | Kinsley | 65/223 |
| 3,352,782 | 5/1966 | Moreau | 65/263 |
| 3,390,426 | 7/1968 | Turner . | |
| 3,434,820 | 3/1969 | Zappia | 65/223 |
| 3,528,796 | 9/1970 | Trahan | 65/360 X |
| 3,586,494 | 6/1971 | Mumford | 65/323 |
| 3,607,206 | 9/1971 | Foster | 65/307 |
| 3,622,305 | 11/1971 | Becker | 65/229 |
| 3,644,111 | 2/1972 | Becker | 65/229 |
| 3,765,862 | 10/1973 | Rowe | 65/229 |
| 4,002,454 | 1/1977 | Rowe | 65/229 |
| 4,004,906 | 1/1977 | Rowe | 65/239 |
| 4,009,016 | 2/1977 | Foster | 65/76 |
| 4,009,018 | 2/1977 | Nebelung | 65/229 |
| 4,013,437 | 3/1977 | Northup | 65/76 |
| 4,058,388 | 11/1977 | Zappia | 65/229 |
| 4,065,286 | 12/1977 | Becker | 65/229 |
| 4,200,449 | 4/1980 | Martin | 65/229 |
| 4,244,726 | 1/1981 | Northup | 65/264 |
| 4,255,179 | 3/1981 | Foster | 65/79 |
| 4,276,073 | 6/1981 | Northup | 65/77 |
| 4,325,725 | 4/1982 | Fujimoto | 65/230 |
| 4,336,050 | 6/1982 | Northup | 65/82 |
| 4,411,681 | 10/1983 | Northup | 65/77 |

FOREIGN PATENT DOCUMENTS 616192  1/1949  United Kingdom ................... 65/81

OTHER PUBLICATIONS

*Heat Transfer Through Glass and Mold During the Glass Forming Process,* Glass International, Sep. 1979, pp. 48 and 50–59.

*Streckblasen,* Kunstosotosse 70, (1980) 7, pp. 395–401.

Primary Examiner—Robert Lindsay
Attorney, Agent, or Firm—Emch, Schaffer & Schaub

[57] ABSTRACT

The present disclosure is directed to an improved method and apparatus for making glass containers. A gob of molten glass is introduced into a parison forming device at the parison forming position. A glass parison is formed, cooled and transferred to an intermediate position where it is allowed to reheat and mechanically stretched to a desired length, while at temperatures between 1200° F. and 2000° F. The elongated parison is transferred to the blow mold position, expanded and cooled to form a glass container.

9 Claims, 6 Drawing Figures

METHOD FOR MAKING GLASS BOTTLES

RELATED APPLICATIONS

This application is a continuation-in-part of application Ser. No. 286,970, filed July 27, 1981 and application Ser. No. 398,363 filed July 14, 1982 both now abandoned.

BACKGROUND OF THE INVENTION

In the glass industry today the most common glass container manufacturing machine is the Hartford type "I.S." machine. It is estimated that in the United States alone, there are over four thousand "I.S." machine sections in daily operation. The basic I.S. machine is described in U.S. Pat. Nos. 1,843,160; 1,911,119 and 2,289,046.

In a conventional Hartford I.S. type of glass bottle machine, the plurality of independent sections are operated in timed relationship to one another. Individual gobs of molten glass from an automatic feeding device are fed to the blank side of each of these sections in timed relationship to one another. Each section has one or more upwardly open blank molds for receiving the molten gob, or groups of gobs, and a baffle is adapted to move in and close the open end of the blank mold to permit the gob to be pressed or otherwise formed from below in order to form an inverted parison at the blank station. This inverted parison is swung over to the blow side of the section where it is placed in an upright orientation in a finishing or blow mold. A blow head decends onto the top of the finishing mold and the parison is blown into its final shape while the transfer mechanism returns with the neck ring mold to form another parison.

Today the lower cost bottle manufacturers are operating triple gob, narrow-neck, blow-and-blow equipment on 7–17 oz. single service beer and beverage bottles in order to obtain the economics of the increased production. A triple or quadruple gob, narrow-neck, press-and-blow operation would be much more economical because it would have the ability to produce more uniform distribution in the bottle, allowing production of lighter-weight ware.

The production rate per cavity in present day narrow-neck press-and-blow operations is not superior to the production rate of the narrow-neck, blow-and-blow operations, although the wide-mouth press-and-blow operation is a substantially higher speed operation than a wide-mouth blow-and-blow operation or a narrow-neck blow-and-blow operation at the same weight and capacity. The reason for this lack of speed in the narrow-neck press-and-blow operation is the necessity of running a "soft" parison. The soft parison allows the parison to "run" in the blow mold until it reaches the proper length to blow. This reduces the available blow mold time for expanding the parison and cooling the glass bottle.

Further, in producing a soft parison less heat is removed from the parison by the blank mold parts, leaving more of the total heat to be removed by the blow mold parts. This is another factor in the lower speed of production.

The primary objective of the present invention is to produce light weight glass bottles in a multiple cavity narrow-neck press-and-blow operation by providing a process which is more productive than current narrow-neck methods and capable of producing lighter weight containers with adequate strength.

Another objective of the present invention is to provide an improved method of making glass containers by creating a time overlap between the parison forming and inverting operation; an intermediate parison elongating operation; and the parison blowing operation, whereby the available reheat time for the parison is increased with no decrease in production output.

Present multiple gob blow-and-blow bottle manufacturing practice produces a parison the length of which is close to the height of the blow mold cavity so that blowing the parison in the blow mold can start shortly after the delivery of the parison to the blow mold. Such long parisons are more difficult to control in the transfer from the blank mold to the blow mold and, further, exhibit variations in the glass distribution which are minimized by the present invention.

SUMMARY OF THE INVENTION

In my invention, the parison is a shape that is formed more easily because its length is only about 50% of the height of the blow mold cavity. In forming the parison, any process can be used as long as the resulting parison is sufficiently chilled on its entire exterior surface and substantially all of the interior surface of its wall to produce on those surfaces what is known in the trade as "enamel".

Following its formation, the parison is transferred to a second station where it is elongated by mechanical stretching. In the preferred embodiment, upon delivery of the parison to the second station, a vacuum pad is attached to the bottom of the parison. Tongs engage the parison just below the finish. Downward movement of the pad mechanically stretches the parison. Following elongation, it is released from the vacuum pad and transferred to the blow mold where it is expanded and cooled to form the bottle. After attaining the desired degree of rigidity, the bottle is transferred to a cooling plate from which it is subsequently pushed onto a conveyor belt which takes it to the annealing lehr.

In my invention, the major part of the heat removed from the individual piece of glass, as it passes through the bottle machine, is removed at the blank mold station, thus producing a relatively "stiff" parison. The use of the intermediate station provides adequate reheat time to attain a more uniform heat distribution in the parison wall. This is necessary for a proper mechanical stretch. It is critical that the temperature in a parison of soda-lime glass be between 1200° F. and 1800° F. depending on the size and thickness of the parison at the time of stretching. For borosilicate glasses this critical temperature range is between 1400° F. and 2000° F.

In the stretching or elongating operation at the second station, the parison is changed from a shape that is easily formed in the blank mold to a shape that is ideal to produce uniform distribution when it is expanded in the blow mold to produce a glass container. It is believed that uniform distribution in my method occurs because of the characteristic of glass to be self-compensating in adjusting its thickness to the action of a drawing force. This self-compensation is due to the relationship between the viscosity and the temperature of glass. Any part of the parison wall which is thicker than an adjacent part at the time of drawing is higher in temperature. The cooling of the parison wall, at the time of the formation of the parison in the blank mold, is applied to the inside and outside surfaces of the wall of the parison.

The thicker, hotter part will stretch more than a thinner part because it is less viscous than the thinner part. As it becomes thinner, under the action of the drawing force, it loses temperature and gains viscosity until it matches the reduced thickness of the other parts.

The use of the intermediate or second station under my method permits overlapping of sequential operations. While one set of parisons are being expanded in the blow mold cavities, a second set of parisons are being reheated and drawn at the second station and a third set is being formed in the blank cavities. This allows maximum utilization of each step of the process with a resultant high production rate. This overlapping also allows a much greater total time of reheat, which aids in producing more uniform temperatures throughout the glass sections as the parison progresses through the process.

The greater reheat combined with the uniformity of glass distribution enables the resultant glass container to cool more rapidly in the blow mold to the desired degree of rigidity, thus creating a substantial increase in the production rate per cavity.

In summary, a preferred method according to the present invention, includes introducing a gob of molten glass into a blank mold where it is formed into a short parison which has been chilled on its entire exterior surface and substantially all of the interior surface of its wall, removing the parison from the blank mold, transferring the parison to another station, intermediate between the blank mold station and the blow mold station, where it is mechanically drawn to a length shorter than the vertical length of the blow mold cavity. After drawing, the parison is transferred to the blow mold and expanded and cooled to form a container. The container is then removed from the blow mold.

DESCRIPTION OF THE PREFERRED EMBODIMENT

Figure 1:
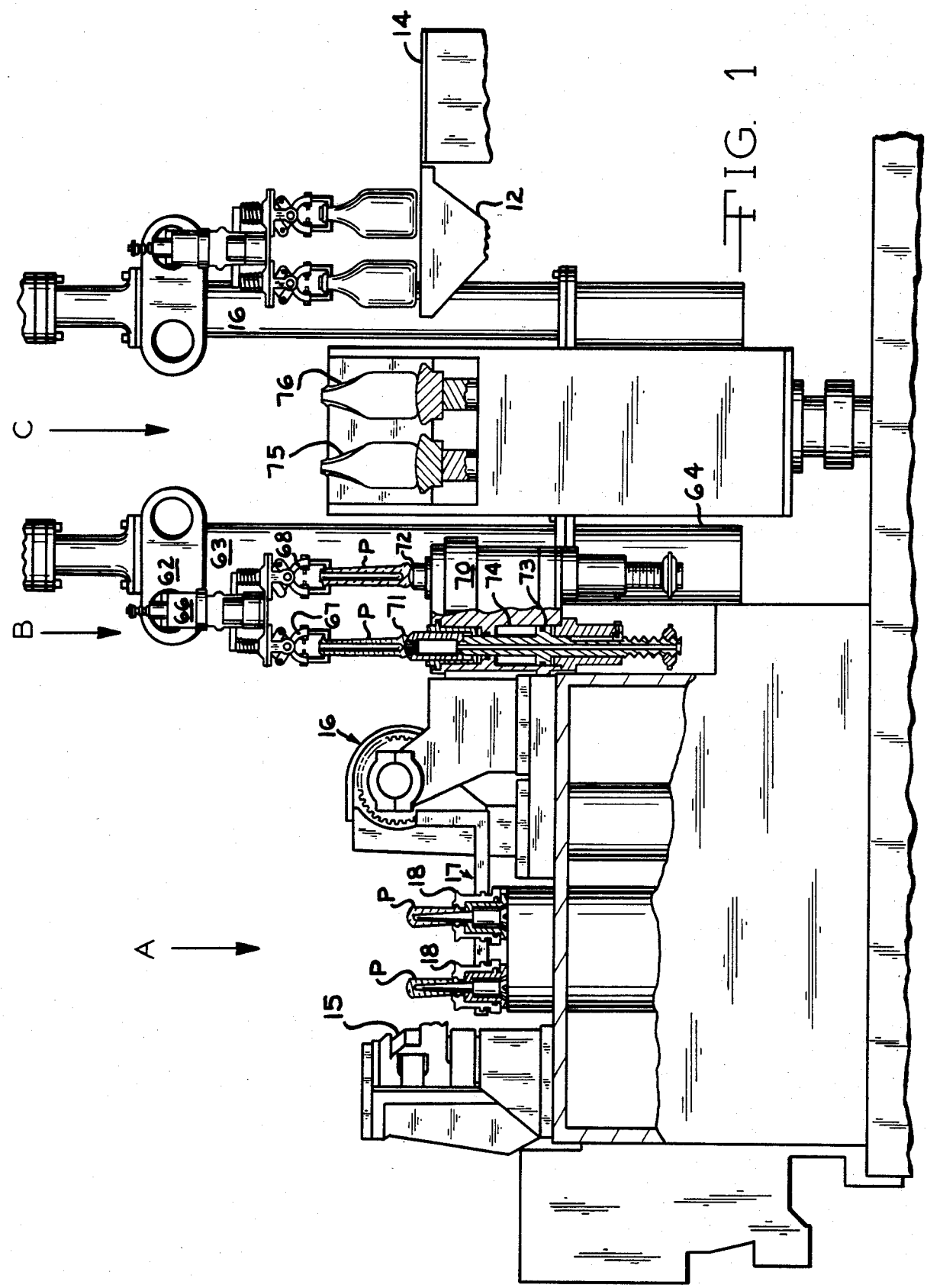
FIG. 1 is a side elevational view of a stationary glass container machine forming section, with portions broken away, illustrating the method of the present invention.
Figure 2:
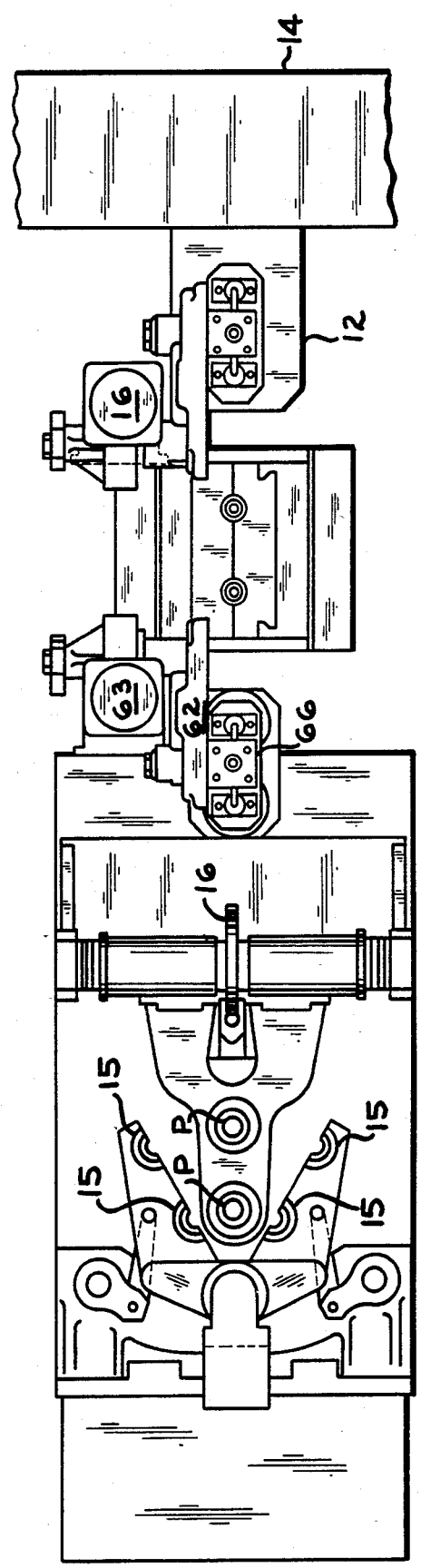
FIG. 2 is a plan view of the machine section shown in FIG. 1 at the point where the parisons have been formed in the blank station and are ready for transfer to the intermediate stations, the parisons in the intermediate station have been mechanically stretched, the parisons in the blow mold have been expanded into bottles and are cooling in the mold and the previously formed bottles are suspended over the cooling plate for final cooling.

Referring to the drawings, FIG. 1 and FIG. 2 show an individual section of a glass container forming machine which has three operating stations, these being designated as a first station A, a second or intermediate station B and a third station C. The machine section shown in adaptable to "multiple gob" operation. A multiplicity of glass parisons are initially formed at station A in an inverted position and then simultaneously uprighted and transferred to station B where they are deposited and mechanically stretched. Following stretching, they are transferred to station C where they are expanded in the blow molds to the desired degree of rigidity. Finally, the glass containers are moved out of the machine section onto a deadplate 12 where they are cooled before being pushed onto a conveyor 14, which conveys them to the annealing lehr (not shown).

The mechanism for forming the parisons at station A may be any mechanism for forming a parison in the conventional I.S. machine. Examples are described in U.S. Pat. Nos. 1,911,119 and 2,508,890 as well as my U.S. patent application Ser. No. 458,169, filed Jan. 24, 1983. Parison or blank molds 15 are shown in FIG. 2, but the remainder of the parison-forming apparatus is not illustrated in detail in the accompanying drawings.

When the parisons P have been formed at station A and the blank molds 15 have been opened, a standard Hartford-Empire inverting mechanism 16 operates to upright the parisons P and move them to station B. In this action, the parisons P are carried by neck rings 18 which are carried on an arm 17. The parisons P after formation and before stretching have a parison length, below the finish, which is less than 75% of the height of the blow mold cavity.

Figure 3:
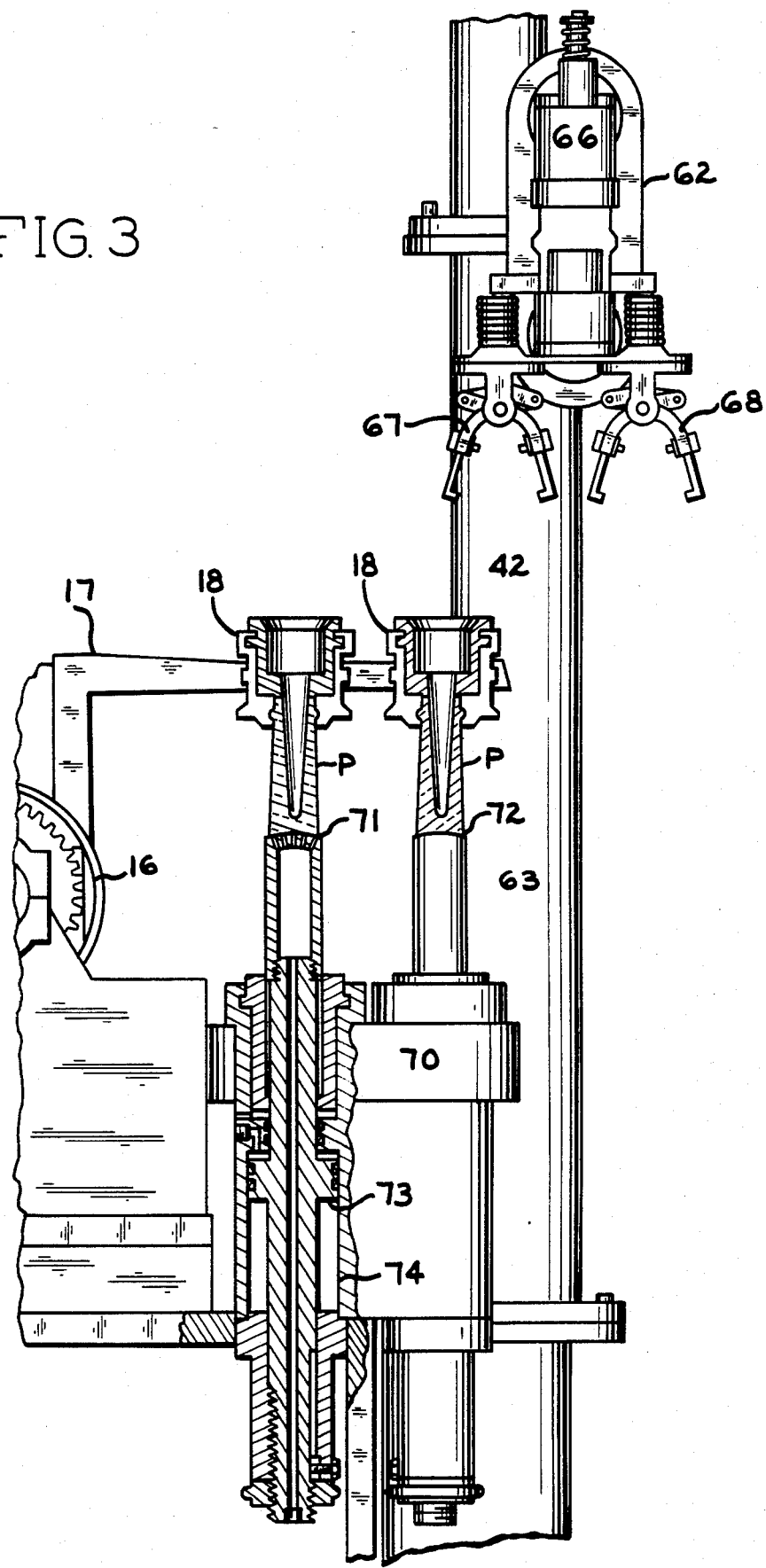
FIG. 3 is a side elevational view of the intermediate station showing the delivery of the parisons to the gripping mechanisms just prior to the release of the neck molds from the parisons (so the neck molds can revert to the blank station to receive the next gobs) and the subsequent attachment of the transfer tongs to the parisons.

When the arm 17 of the inverting mechanism 16 reaches a horizontal position in which the parisons P are held substantially vertical at station B, as shown in FIG. 3, the bottom of the parisons P are engaged by vaccum grippers 71 and 72 of a vaccum head assembly 70. Prior to this engagement, the vacuum grippers 71 and 72 have been moved upwardly to the point shown in FIG. 3, by the action of pistons 73 operating in cylinders 74.

At station B or the intermediate station, the parisons continue to reheat. This additional reheat and the mechanical stretching results in a stretched parison which has a much more uniform wall thickness than known in the prior art. This uniform wall thickness in the stretched parisons P allows the blowing of bottles in blow molds 75, 76 having thin, uniform walls of adequate strength. My method has resulted in the increased production of uniform bottles of a lighter weight, having good strength properties. It has been found that my method is particularly useful in the high production of narrow neck bottles, such as beer bottles.

The mechanical stretching of the parison occurs at temperatures between 1200° F. and 2000° F.

Figure 4:
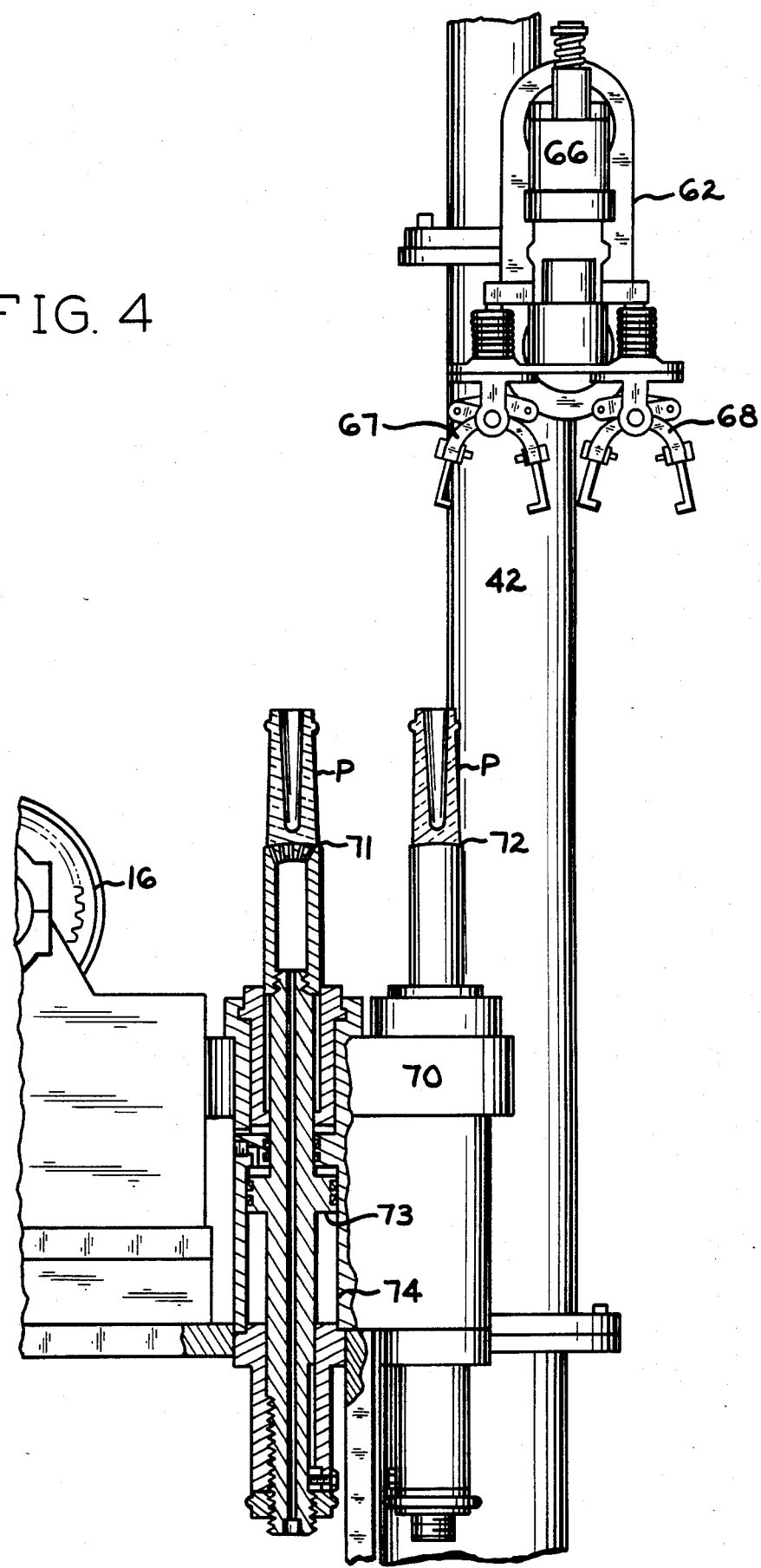
FIG. 4 is a side elevational view of the intermediate station at the instant immediately after the time when the neck molds have released the parisons and reverted away from the station and the tongs of the transfer mechanism have not yet been moved into position to grasp the parisons.

Immediately following the engagement of the parison P with the vacuum grippers 71 and 72, the neck rings 18 are opened and disengaged from the parisons P after which the invert mechanism 16 inverts to move the empty neck rings 18 back to station A for the start of another parison forming cycle, leaving the parisons P on the vacuum grippers 71 and 72, as shown in FIG. 4. Timing means, either a mechanical timing drum or an electronic timer is provided to increase or decrease reheat time between the parison-forming at station A and stretching at station B, with a subsequent decrease or increase of the reheat time between stretching of the parison at station B and the expansion of the elongated parison at the blow mold located at station C.

Figure 5:
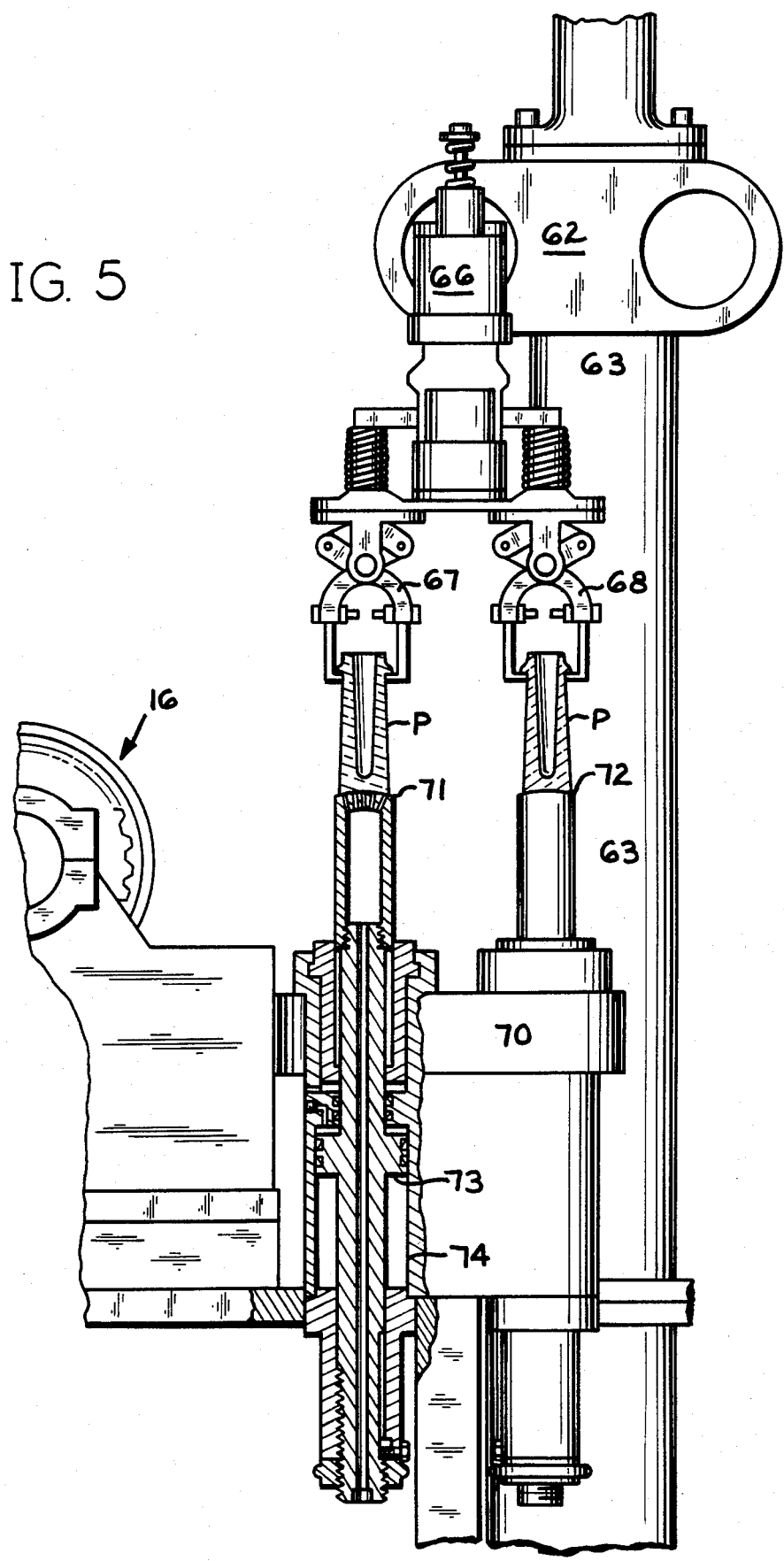
FIG. 5 is a side elevational view of the intermediate station showing the tongs engaging the parisons immediately below the finishes, ready for the subsequent mechanical stretching.

As soon as the inverting neck rings 18 have cleared the station B area, a transfer mechanism 42 moves tongs 67 and 68 to take hold of the parisons P under the beads or undercuts of their finishes, as shown in FIG. 5.

In the present machine section, the transfer mechanism 42 includes a rotary transfer arm 62 which is pivotally mounted on a vertical housing frame 63. The pivot point for the transfer arm 62 is located midway between the centers of station B and station C. The pivoted end of the transfer arm 62 mounts a pinion (not shown) which mates with a vertical movable rack (not shown) positioned within the vertical housing 63. A transfer arm cylinder contains a piston which is connected to the rack and movement of the rack rotates the transfer arm between station B and station C. A tong mechanism 66, including the tongs 67 and 68, is pivotally mounted on the distal end of the transfer arm 62.

Figure 6:
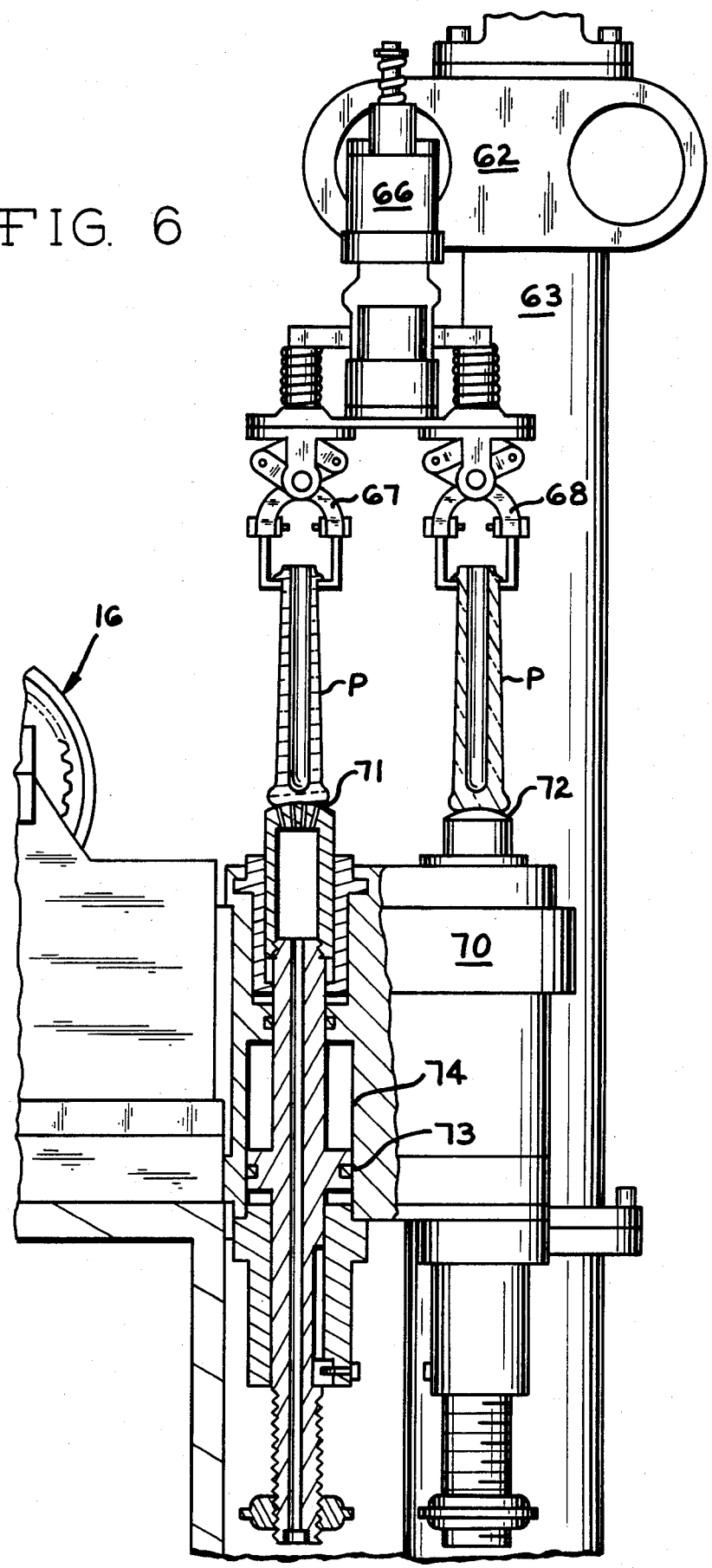
FIG. 6 is a side elevational view of the intermediate station showing the gripping mechanism lowered with the resultant mechanical stretching or elongation of the parisons.

With the hot parison P held between the tongs 67 and 68 and the vacuum grippers 71 and 72, the parisons P are drawn downwardly to the desired length of the blow mold cavities, by the action of pistons 73 operating in cylinders 74, as shown in FIG. 6. The desired length is normally a length slightly shorter than the depth of the blow mold. After the drawing process, the vacuum grippers release the parisons P. The transfer mechanism is then activated and the transfer arm 62 rotated so that the tongs 67 and 68 transfer the lengthened parison P to station C where they are positioned in blow molds 75 and 76.

As soon as the blow molds 75 and 76 are closed around the parisons P, the tongs 67 and 68 open to release their hold on the parisons P. Subsequently, the transfer arm 62 rotates back towards station B but stops and rests at the vertical position shown in FIG. 3 to await the delivery of the next parisons P from station A to station B.

The parisons P which have been delivered to the blow molds 75 and 76 are subsequently expanded and cooled to their final shape by compressed air, vacuum, or a combination of compressed air and vacuum. The blow mold operation is well-known in the art.

In one embodiment the parisons P are expanded to the configuration of the blow molds 75, 76 by applying vacuum to the exterior of the parisons P.

In another embodiment compressed air is applied to the interiors of the formed glass containers, while still in the blow molds 75, 76, after they have been formed by the vacuum expansion to assist the cooling of the time glass in the blow molds 75, 76.

In still another embodiment, the parisons are expanded to the configurations of the blow molds 75, 76 by applying compressed air to the interior of the parisons P and vacuum to the exterior of the parisons P simultaneously.

The glass containers are then taken out of the blow molds 75 and 76 by the take-out mechanism 16 and deposited on the cooling dead plate 12 before being pushed on to the conveyor 14 which conveys them to the annealing lehr or oven.

The timing for the control and operation of all the various machine components is derived through the use of a standard Hartford I.S. timing drum and valve block (not shown). As is well-known in the art, air lines associated with each of the various valves in the valve block portion of the timing mechanism provide signals for operation of the various fluid drives in the glass container forming machine section. A disclosure of this type of timing drum control system is found in Ingle U.S. Pat. No. 1,911,119, which is incorporated herein by reference. In another embodiment of the present machine, electronic controls are used rather than timing drum controls.

It should be apparent that, while preferred embodiments of the present invention have been described in detail, other embodiments and modifications will be apparent to persons skilled in that art without departing from the scope of the invention as defined in the following claims.

What I claim is:

1. A method of manufacturing glass containers on a stationary, individual section bottle machine having a parison forming position and a blow mold position including, in combination, introducing a gob of molten glass into a parison forming device, forming a glass parison, cooling the glass parison, transferring the parison to a station intermediate to the parison forming position and the blow mold position the intermediate station being spaced from and exterior to both the parison forming station and the blow mold station, mechanically stretching the parison to a desired length while it is at the intermediate station, transferring the elongated parison to a blow mold, having a blow mold cavity, and expanding and cooling the parison to form a glass container.

2. A method of manufacturing glass containers, according to claim 1, wherein, a multiple-cavity parison forming device is at the parison forming position, introducing more than one gob to the multiple-cavity parison-forming device, whereby a multiplicity of glass parisons are produced, cooled, transferred, elongated, transferred, expanded and cooled in a multiple-cavity blow mold to form a multiplicity of glass containers and removing the containers from the blow mold.

3. A method of manufacturing glass containers, according to claim 1, wherein the parison length below the finish, and before stretching, is less than 75% of the height of the blow mold cavity.

4. A method of manufacturing glass containers, according to claim 1, wherein while the parison is stretched at the station intermediate to the parison-forming station and the blow mold station, the bottom of the parison is engaged with a gripping mechanism and the top of the parison is held with tongs which engage the parison immediately below the finish bead or undercut, the parison being mechanically stretched to a predetermined length by moving the gripping mechanism downwardly and/or the tongs upwardly and subsequently releasing the gripping mechanism from contact with the parison to allow the parison to be transferred.

5. A method of manufacturing glass containers, according to claim 4 wherein timing means are provided to vary the point in the process when the stretching takes place so as to increase or decrease the reheat time between the parison-forming and the stretching with a subsequent decrease or increase of the reheat time between stretching of the parison and the expansion of the enlongated parison in the blow mold.

6. A method of manufacturing glass containers according to claim 4, wherein the tongs of the transfer mechanism located between the intermediate station and blow mold station are used to hold the parison under the finish while the parison is being mechanically stretched as well as being used to transfer the elongated parison to the blow mold.

7. A method of manufacturing glass containers, according to claim 1, wherein the parison is expanded to the configuration of the blow mold by applying vacuum to the exterior of the parison.

8. A method of manufacturing glass containers, according to claim 7, wherein compressed air is applied to the interior of the glass container after it has been formed by the vaccum expansion to assist the cooling of the glass in the blow mold.

9. A method of manufacturing glass containers, according to claim 1, wherein the parison is expanded to the configuration of the blow mold by applying compressed air to the interior of the parison and vacuum to the exterior simultaneously.

* * * * *